(12) United States Patent
Nakajima et al.

(10) Patent No.: US 11,581,559 B2
(45) Date of Patent: Feb. 14, 2023

(54) CARBON DIOXIDE PRODUCTION SYSTEM

(71) Applicant: TOKYO GAS CO., LTD., Tokyo (JP)

(72) Inventors: Tatsuya Nakajima, Tokyo (JP); Tatsuki Dohkoh, Tokyo (JP); Marie Shirai, Tokyo (JP)

(73) Assignee: TOKYO GAS CO., LTD., Tokyo (JP)

( * ) Notice: Subject to any disclaimer, the term of this patent is extended or adjusted under 35 U.S.C. 154(b) by 252 days.

(21) Appl. No.: 16/967,036

(22) PCT Filed: Jan. 24, 2019

(86) PCT No.: PCT/JP2019/002372
§ 371 (c)(1),
(2) Date: Aug. 3, 2020

(87) PCT Pub. No.: WO2019/155901
PCT Pub. Date: Aug. 15, 2019

(65) Prior Publication Data
US 2021/0036351 A1    Feb. 4, 2021

(30) Foreign Application Priority Data

Feb. 6, 2018   (JP) .............................. JP2018-019502

(51) Int. Cl.
*H01M 8/0668*     (2016.01)
*B01D 53/047*     (2006.01)
*H01M 8/04746*    (2016.01)
*H01M 8/04791*    (2016.01)

(52) U.S. Cl.
CPC ........ *H01M 8/0668* (2013.01); *B01D 53/047* (2013.01); *H01M 8/04746* (2013.01); *H01M 8/04791* (2013.01)

(58) Field of Classification Search
CPC .................................................... B01D 53/047
See application file for complete search history.

(56) References Cited

U.S. PATENT DOCUMENTS

2016/0355933 A1    12/2016   Diethelm et al.

FOREIGN PATENT DOCUMENTS

| JP | A H06-203845 | 7/1994 |
|---|---|---|
| JP | 2009224264 | 10/2009 |
| JP | A 2012-71290 | 4/2012 |
| JP | A 2016-184504 | 10/2016 |
| JP | A 2017-134947 | 8/2017 |
| JP | 2018107098 | 7/2018 |

OTHER PUBLICATIONS

PCT Written Opinion (non-English) for corresponding PCT Application No. PCT/JP2019/002372, dated Apr. 8, 2019, 5 pages.
PCT International Search Report (English translation) for corresponding PCT Application No. PCT/JP2019/002372, dated Apr. 8, 2019, 2 pages.
Partial European Search Report for corresponding European Patent Application No. 19751630.5, dated Mar. 10, 2022, 12 pages.

*Primary Examiner* — Sarah A. Slifka
(74) *Attorney, Agent, or Firm* — Dority & Manning, P.A.

(57) ABSTRACT

A carbon dioxide production system 10A includes: a fuel cell stack 16; a separation unit 20 that separates anode off-gas into a non-fuel gas including at least carbon dioxide and water and a regenerative fuel gas; a second heat exchanger 32 that separates water from the non-fuel gas; a water tank 42; and a carbon dioxide recovery tank 48 that recovers the carbon dioxide after the water has been separated.

11 Claims, 8 Drawing Sheets

CARBON DIOXIDE PRODUCTION SYSTEM

PRIORITY CLAIM

The present application is a 371 of International Application No. PCT/JP2019/002372 filed Jan. 24, 2019, which claims priority to Japanese Application No. 2018-019502 filed on Feb. 6, 2018, which is incorporated herein in its entirety by reference thereto.

TECHNICAL FIELD

The present invention relates to a carbon dioxide production system.

BACKGROUND ART

When a carbon compound fuel is used in a fuel cell system, carbon dioxide is generated. This carbon dioxide is also included in the anode off-gas discharged from the anode, and when the anode off-gas is used as a regenerative fuel for electricity generation, the carbon dioxide is removed from the anode off-gas.

For example, JP-A No. H6-203845 discloses a technology that condenses the anode off-gas to separate steam, introduces the anode off-gas from which the steam has been separated to a carbon dioxide separation device, and separates and recovers the carbon dioxide with a separation membrane.

SUMMARY OF INVENTION

Technical Problem

High-concentration carbon dioxide can be easily recovered by separating and recovering carbon dioxide from the anode off-gas of a fuel cell system in which the concentration of carbon dioxide is high compared to combustion exhaust gas with which the cathode off-gas mixes. In this case, a method is needed to efficiently reutilize the regenerative fuel gas for electricity generation and to also recover the carbon dioxide.

The present invention has been made in consideration of the above circumstances, and it is an object thereof to easily separate the carbon dioxide from the anode off-gas and to efficiently reutilize the regenerative fuel gas for electricity generation.

Solution to Problem

A carbon dioxide production system pertaining to a first aspect of the disclosure includes: a fuel cell that generates electricity by means of a fuel gas, including a carbon compound, that is supplied to a fuel electrode and an oxidant gas, including oxygen, that is supplied to an air electrode, with anode off-gas being discharged from the fuel electrode; a separation unit that separates the anode off-gas into a non-fuel gas including at least carbon dioxide and water, and a regenerative fuel gas; a water separation unit that separates the water from the non-fuel gas; and a carbon dioxide recovery unit that recovers the carbon dioxide after the water has been separated by the water separation unit.

In the carbon dioxide production system pertaining to the first aspect, electricity generation in the fuel cells is performed by the fuel gas supplied to the fuel electrode and the oxidant gas supplied to the air electrode. The fuel gas includes a carbon compound, and the anode off-gas including at least carbon dioxide and water is discharged from the fuel electrode. It will be noted that the fuel gas here is not particularly limited so long as it includes a carbon compound, and, for example, the fuel gas may be a reformed gas obtained by reforming a hydrocarbon compound, or a hydrocarbon compound itself, or carbon monoxide itself.

The separation unit separates the anode off-gas into the non-fuel gas including at least carbon dioxide and water and the regenerative fuel gas. Compared to a case where the water is separated by condensation, the regenerative fuel gas can be kept at a high temperature, so thermal energy loss can be reduced and the regenerative fuel gas can be efficiently used for electricity generation. Furthermore, compared to a case where only the carbon dioxide is separated from the anode off-gas, flexibility in selecting the separating means can be increased.

The water is separated from the non-fuel gas by the water separation unit, and the non-fuel gas after the water has been separated is recovered by the carbon dioxide recovery unit. The non-fuel gas after being separated from the regenerative fuel gas has water and carbon dioxide as its main components, so the water can be easily separated by condensation.

A carbon dioxide production system pertaining to a second aspect of the disclosure further includes a second fuel cell that generates electricity using the regenerative fuel gas, which is dispensed from the separation unit.

According to the carbon dioxide production system pertaining to the second aspect, electricity is generated by the second fuel cell using the regenerative fuel gas, so electricity generation efficiency can be enhanced.

In a carbon dioxide production system pertaining to a third aspect of the disclosure, the separation unit is partitioned into a non-transmitting side and a transmitting side by a separation membrane that allows the non-fuel gas to pass therethrough, and the carbon dioxide production system further includes a suction pump that sucks the non-fuel gas from the transmitting side and sends the non-fuel gas to the carbon dioxide recovery unit.

According to the carbon dioxide production system pertaining to the third aspect, by performing suction with the suction pump, transmission of the non-fuel gas to the transmitting side can be promoted.

A carbon dioxide production system pertaining to a fourth aspect of the disclosure includes: a fuel cell that generates electricity by means of a fuel gas including a carbon compound, that is supplied to a fuel electrode and an oxidant gas including oxygen, that is supplied to an air electrode, with anode off-gas being discharged from the fuel electrode; a separation unit that separates the anode off-gas into a non-fuel gas including at least carbon dioxide, and a regenerative fuel gas; a carbon dioxide recovery unit that recovers the non-fuel gas after it has been separated by the separation unit; and a carbon dioxide regulation unit that regulates, to a set range, at least one of a concentration of the carbon dioxide in the non-fuel gas recovered by the carbon dioxide recovery unit or the flow rate of the non-fuel gas.

In the carbon dioxide production system pertaining to the fourth aspect, electricity generation in the fuel cells is performed by the fuel gas supplied to the fuel electrode and the oxidant gas supplied to the air electrode. The fuel gas includes a carbon compound, and the anode-off gas including at least carbon dioxide and water is discharged from the fuel electrode. The separation unit separates the anode off-gas into the non-fuel gas including at least carbon dioxide and the regenerative fuel gas. Additionally, at least one of the concentration of the carbon dioxide in the non-fuel gas recovered by the carbon dioxide recovery unit and the flow rate of the non-fuel gas is regulated to the set range by the carbon dioxide regulation unit. Because of this, carbon dioxide with a concentration and flow rate in a desired set range can be recovered.

A carbon dioxide production system pertaining a fifth aspect of the disclosure further includes a second fuel cell that generates electricity using the regenerative fuel gas, which is dispensed from the separation unit.

According to the carbon dioxide production system pertaining to the fifth aspect, electricity is generated by the second fuel cell using the regenerative fuel gas, so electricity generation efficiency can be enhanced.

A carbon dioxide production system pertaining to a sixth aspect of the disclosure is characterized in that the carbon dioxide regulation unit regulates an amount of electricity generated by the fuel cell.

According to the carbon dioxide production system pertaining to the sixth aspect, by regulating the amount of electricity generated by the fuel cell, the carbon dioxide concentration in the anode off-gas and the carbon dioxide flow rate change, so the amount and concentration of carbon dioxide per time recovered by the carbon dioxide recovery unit can be regulated.

A carbon dioxide production system pertaining to a seventh aspect of the disclosure is characterized in that the carbon dioxide regulation unit regulates an amount of electricity generated in the entire system.

According to the carbon dioxide production system pertaining to the seventh aspect, by regulating the amount of electricity generated in the entire system, the carbon dioxide concentration in the anode off-gas and the carbon dioxide flow rate change, so the amount and concentration of carbon dioxide per time recovered by the carbon dioxide recovery unit can be regulated.

In a carbon dioxide production system pertaining to an eighth aspect of the disclosure, the separation unit separates the anode off-gas into a non-fuel gas including at least carbon dioxide and water and a regenerative fuel gas, and the carbon dioxide production system further includes a water separation unit that separates the water from the non-fuel gas.

According to the carbon dioxide production system pertaining to the eighth aspect, compared to a case where the water is separated by condensation, the regenerative fuel gas can be kept at a high temperature, so the regenerative fuel gas can be efficiently used for electricity generation. Furthermore, compared to a case where just the carbon dioxide is separated from the anode off-gas, options for the separating means can be expanded.

The water is separated from the non-fuel gas by the water separation unit, and the non-fuel gas after the water has been separated is recovered by the carbon dioxide recovery unit. The non-fuel gas after being separated from the regenerative fuel gas has water and carbon dioxide as its main components, so options for the means for separating the water can be expanded.

A carbon dioxide production system pertaining to a ninth aspect of the disclosure is characterized in that the water separation unit removes steam from the non-fuel gas by condensation, and the carbon dioxide regulation unit regulates the condensate in the water separation unit.

According to the carbon dioxide production system pertaining to the ninth aspect, by regulating the condensate in the water separation unit, the concentration of the carbon dioxide recovered by the carbon dioxide recovery unit can be regulated.

A carbon dioxide production system pertaining to a tenth aspect of the disclosure further comprising a pressure swing adsorption unit downstream of the water separation unit, and the carbon dioxide regulation unit regulates adsorption conditions in the pressure swing adsorption unit.

According to the carbon dioxide production system pertaining to the tenth aspect, by regulating the adsorption conditions in the pressure swing adsorption unit, the concentration of the carbon dioxide recovered by the carbon dioxide recovery unit can be regulated.

A carbon dioxide production system pertaining to an eleventh aspect of the disclosure is characterized in that the carbon dioxide regulation unit regulates the fuel gas amount sent to the fuel electrode.

According to the carbon dioxide production system pertaining to the eleventh aspect, by regulating a fuel gas amount sent to the fuel electrode, the carbon dioxide concentration in the anode off-gas and the carbon dioxide flow rate change, so the amount and concentration of carbon dioxide per unit time recovered by the carbon dioxide recovery unit can be regulated.

A carbon dioxide production system pertaining to a twelfth aspect of the disclosure further comprising a reformer that reforms feedstock gas to produce the fuel gas, and the carbon dioxide regulation unit regulates the amount of reforming water supplied to the reformer.

According to the carbon dioxide production system pertaining to the twelfth aspect, by regulating the amount of the reforming water supplied to the reformer, the amount and concentration of carbon dioxide per time recovered by the carbon dioxide recovery unit can be regulated.

In a carbon dioxide production system pertaining to a thirteenth aspect of the disclosure, the separation unit is partitioned into a non-transmitting side and a transmitting side by a separation membrane that allows the non-fuel gas to pass therethrough, and the carbon dioxide production system further includes a suction pump that sucks the non-fuel gas from the transmitting side and sends the non-fuel gas to the carbon dioxide recovery unit.

According to the carbon dioxide production system pertaining to the thirteenth aspect, by using the suction pump to lower the pressure of the transmitting side, the carbon dioxide can be recovered without lowering the concentration of the carbon dioxide.

A carbon dioxide production system pertaining to a fourteenth aspect of the disclosure is characterized in that the separation unit is partitioned into a non-transmitting side and a transmitting side by a separation membrane that allows the non-fuel gas to pass therethrough, the carbon dioxide production system further includes a suction pump that sucks the non-fuel gas from the transmitting side and sends it to the carbon dioxide recovery unit, and the carbon dioxide regulation unit regulates the suction flow rate of the suction pump.

According to the carbon dioxide production system pertaining to the fourteenth aspect, by regulating the suction flow rate of the suction pump, the flow rate of the carbon dioxide recovered by the carbon dioxide recovery unit can be regulated.

Advantageous Effects of Invention

According to the carbon dioxide production system pertaining to the invention, the carbon dioxide can be efficiently separated from the anode off-gas, and the regenerative fuel gas for electricity generation can be efficiently reutilized.

DESCRIPTION OF EMBODIMENTS

Examples of embodiments of the invention will be described in detail below with reference to the drawings.

First Embodiment

Figure 1:
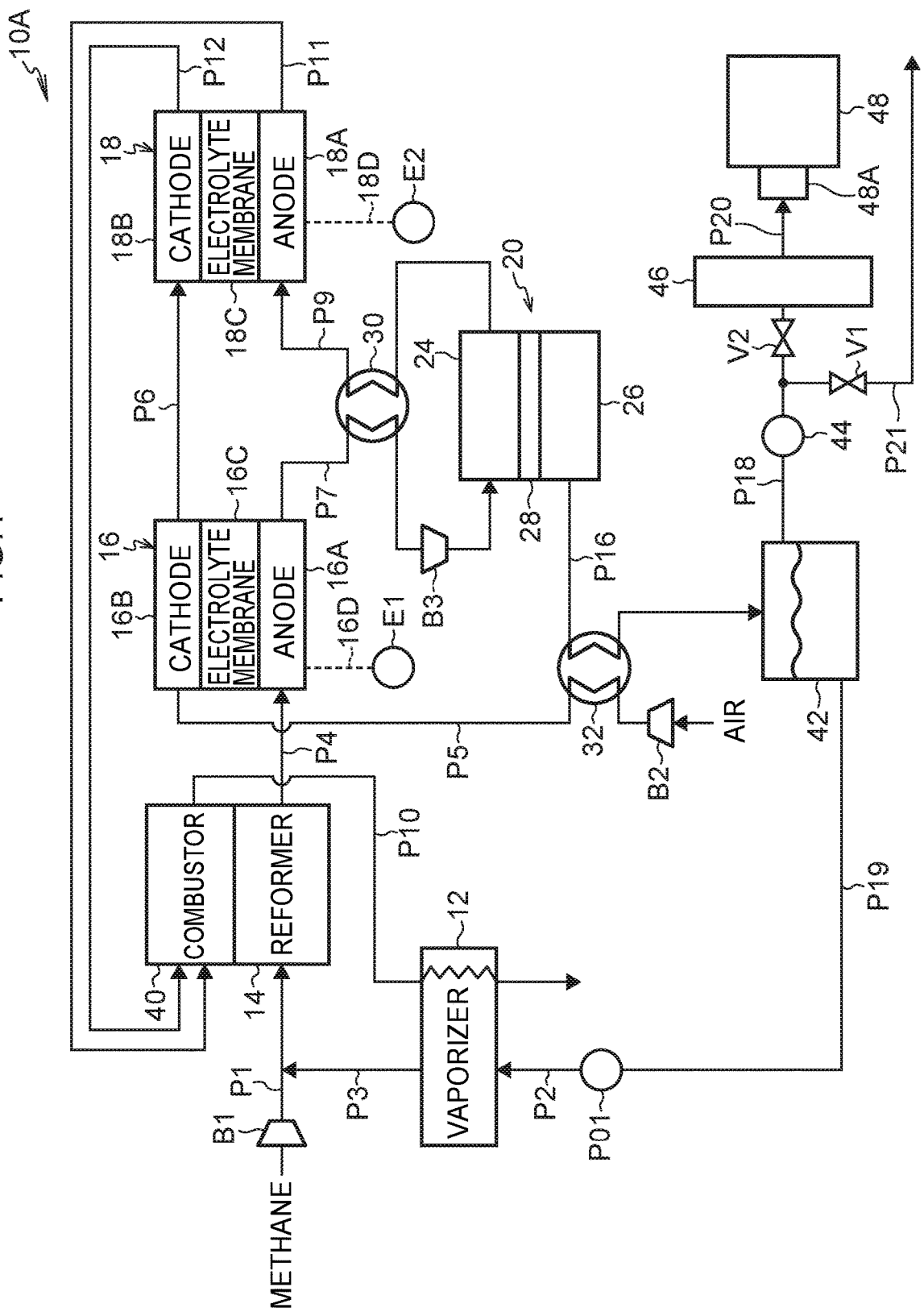
FIG. 1 is a schematic diagram of a carbon dioxide production system pertaining to a first embodiment.
Figure 2:
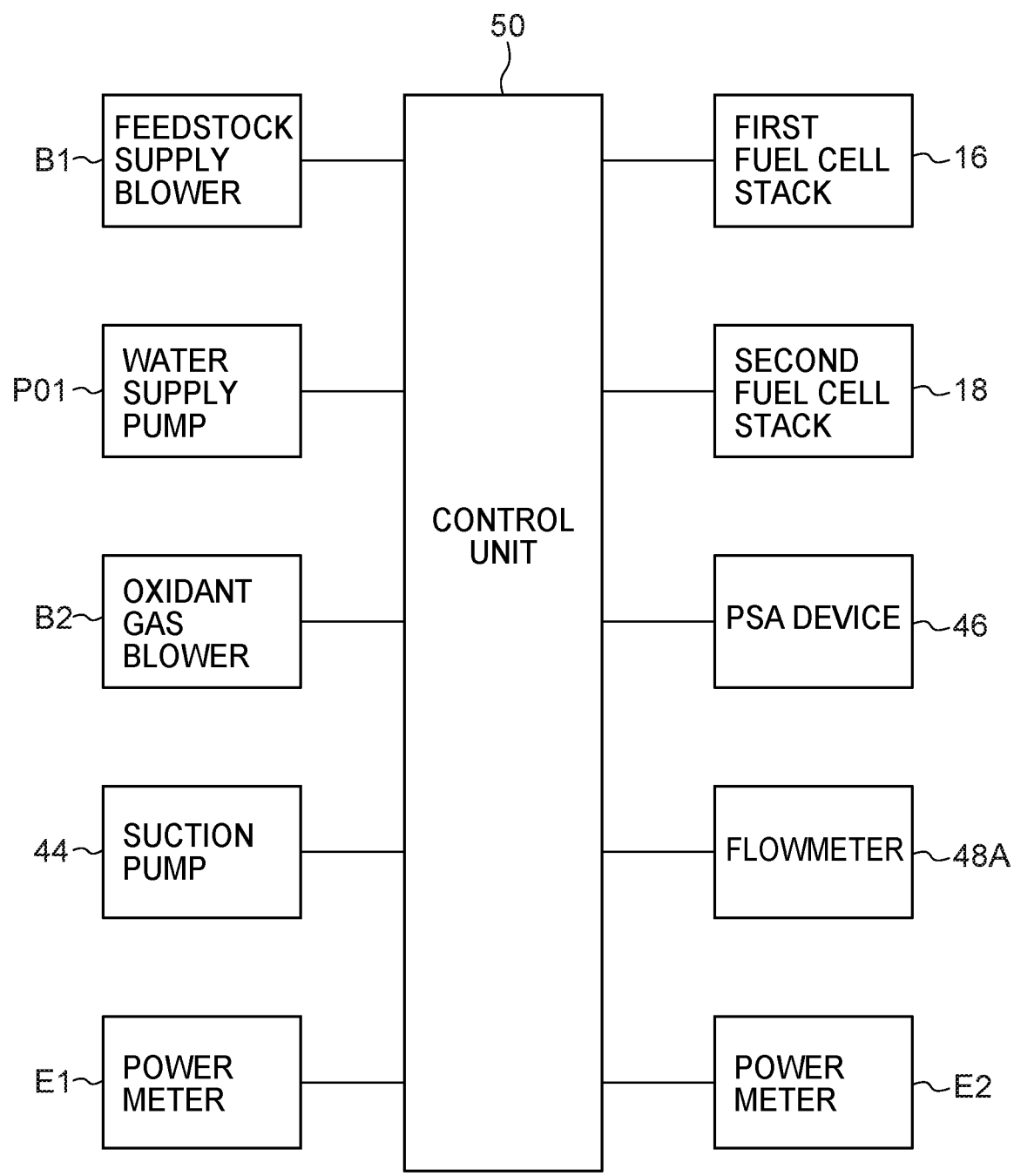
FIG. 2 is a block diagram of a control system of the carbon dioxide production system pertaining to the first embodiment.

FIG. 1 shows a carbon dioxide production system 10A pertaining to a first embodiment of the invention. The carbon dioxide production system 10A includes, as its main configuration, a vaporizer 12, a reformer 14, a first fuel cell stack 16, a second fuel cell stack 18, a separation unit 20, a first heat exchanger 30, a second heat exchanger 32, a combustor 40, a water tank 42, a suction pump 44, a PSA (Pressure Swing Adsorption) device 46, and a carbon dioxide recovery tank 48. Furthermore, as shown in FIG. 2, the carbon dioxide production system 10A includes a control unit 50 that controls the carbon dioxide production system 10A.

One end of a feedstock gas pipe P1 is connected to the reformer 14, and the other end of the feedstock gas pipe P1 is connected to a gas source not shown in the drawings. Methane is sent by a feedstock supply blower B1 from the gas source to the reformer 14. It will be noted that although methane is used as the feedstock gas in the present embodiment, the feedstock gas is not particularly limited so long as it is a reformable gas, and hydrocarbon fuels can be used. Examples of hydrocarbon fuels include natural gas, LP gas (liquefied petroleum gas), coal-reformed gas, and light hydrocarbon gases. Examples of light hydrocarbon gases include light hydrocarbons having 4 or fewer carbon atoms, such as methane, ethane, ethylene, propane, and butane, but methane used in the present embodiment is preferred. It will be noted that the hydrocarbon fuel may also be a mixture of the aforementioned light hydrocarbon gases, and the aforementioned light hydrocarbon gas may also be a gas such as natural gas, city gas, or LP gas.

A water supply pipe P2 is connected to the vaporizer 12, and water (liquid phase) is fed into the vaporizer 12 by a water supply pump PO1. In the vaporizer 12, the water is gasified. For the gasification, heat of the later-described combustor 40 is used. Steam is sent from the vaporizer 12, and a steam pipe P3 that sends the steam merges with the feedstock gas pipe P1.

The methane and the steam are combined in the feedstock gas pipe P1 and supplied to the reformer 14. The reformer 14 is adjacent to the combustor 40, the first fuel cell stack 16, and the second fuel cell stack 18 and is heated by exchanging heat with them.

The reformer 14 reforms the methane to generate a fuel gas having a temperature of about 600° C. and including hydrogen. The reformer 14 is connected to an anode (fuel electrode) 16A of the first fuel cell stack 16. The fuel gas generated in the reformer 14 is supplied via a fuel gas pipe P4 to the anode 16A of the first fuel cell stack 16. It will be noted that a feedstock gas component unreacted in the reformer 14 is also included in the fuel gas and supplied to the anode 16A.

The first fuel cell stack 16 is a solid oxide fuel cell stack and has a plurality of stacked fuel cells. The first fuel cell stack 16 is an example of a fuel cell (a first fuel cell) in the invention, and in the present embodiment its operating temperature is configured to be about 650° C. The individual fuel cells have an electrolyte layer 16C and an anode 16A and a cathode (air electrode) 16B stacked on front and back surfaces of the electrolyte layer 16C.

It will be noted that the basic configuration of the second fuel cell stack 18 is the same as that of the first fuel cell stack 16, so that the second fuel cell stack 18 has an anode 18A corresponding to the anode 16A, a cathode 18B corresponding to the cathode 16B, and an electrolyte layer 18C corresponding to the electrolyte layer 16C.

An oxidant gas (air) is supplied from an oxidant gas pipe P5 to the cathode 16B of the first fuel cell stack 16. The air is introduced to the oxidant gas pipe P5 by an oxidant gas blower B2. The second heat exchanger 32 is provided in the oxidant gas pipe P5, and the air is heated by heat exchange with a later-described non-fuel gas and supplied to the cathode 16B.

In the cathode 16B, as shown in formula (1) below, oxygen in the oxidant gas and electrons react to produce oxygen ions. The oxygen ions that have been produced travel through the electrolyte layer and reach the anode 16A of the first fuel cell stack 16.

Air Electrode Reaction $$½O_2 + 2e^- \rightarrow O^{2-} \tag{1}$$

Furthermore, a cathode off-gas pipe P6 that guides cathode-off gas discharged from the cathode 16B to the cathode 18B of the second fuel cell stack 18 is connected to the cathode 16B.

Meanwhile, in the anode 16A of the first fuel cell stack 16, as shown in formula (2) and formula (3) below, the oxygen ions that have traveled through the electrolyte layer react with hydrogen and carbon monoxide in the fuel gas, producing water (steam) along with carbon dioxide and electrons. The electrons produced in the anode 16A move from the anode 16A through an external circuit to the cathode 16B, whereby electricity is generated in each fuel cell. Furthermore, each fuel cell emits heat during electricity generation. A power meter E1 is connected to a power cable 16D that draws electrical power from the first fuel cell stack 16. The electrical power that is output from the first fuel cell stack 16 is measured by the power meter E1. The amount of electricity generated by the first fuel cell stack 16 is controlled by the control unit 50.

Fuel Electrode Reactions

$$H_2 + O^{2-} \rightarrow H_2O + 2e \qquad (2)$$

$$CO + O^{2-} \rightarrow CO_2 + 2e \qquad (3)$$

One end of an anode off-gas pipe P7 is connected to the anode 16A of the first fuel cell stack 16, and anode off-gas is discharged from the anode 16A to the anode off-gas pipe P7. The anode off-gas includes an unreformed feedstock gas component, unreacted hydrogen, unreacted carbon monoxide, carbon dioxide, and steam.

It will be noted that the fuel cells of the invention are not limited to solid oxide fuel cells (SOFC) and may also be other fuel cells where carbon dioxide and is included in the anode off-gas, such as molten carbonate fuel cells (MCFC), phosphoric acid fuel cells (PAFC), or polymer electrolyte fuel cells (PEFC).

The other end of the anode off-gas pipe P7 is connected via the later-described first heat exchanger 30 to an inflow portion 24 of the separation unit 20. The separation unit 20 separates, by means of a later-described separation membrane 28, the carbon dioxide and water from the anode off-gas. The separation unit 20 has the inflow portion 24 and a transmitting portion 26. The inflow portion 24 and the transmitting portion 26 are partitioned by the separation membrane 28. The inflow portion 24 is the anode off-gas non-transmitting side, and the transmitting portion 26 is the transmitting side.

Here, the separation membrane 28 will be described. In the present embodiment, the separation membrane 28 uses a membrane having the function of allowing the carbon dioxide and water to pass through it. The membrane is not particularly limited so long as it has the function of allowing the carbon dioxide and water to pass through it, and examples thereof include organic polymer membranes, inorganic material membranes, organic polymer-inorganic material composite membranes, and liquid membranes.

The anode off-gas is supplied via the anode off-gas P7 to the inflow portion 24 of the separation unit 20. The carbon dioxide and water included the anode off-gas pass through the separation membrane 28 and move to the transmitting portion 26. The anode off-gas remaining on the inflow portion 24 side with reduced concentrations of carbon dioxide and water becomes regenerative fuel gas and is sent from the inflow portion 24. A regenerative fuel gas pipe P9 is connected to the anode 18A of the second fuel cell stack 18, and the regenerative fuel gas is supplied via the regenerative fuel gas pipe P9 to the anode 18A of the second fuel cell stack 18.

The anode off-gas flowing through the anode off-gas pipe P7 and the regenerative fuel gas flowing through the regenerative fuel gas pipe P9 exchange heat in the first heat exchanger 30. In the first heat exchanger 30, the anode off-gas is cooled and the regenerative fuel gas is heated.

The other end of a non-fuel gas pipe P16 having one end connected to the water tank 42 is connected to the transmitting portion 26 of the separation unit 20.

In the separation unit 20, the carbon dioxide and water (gas phase) move from the inflow portion 24 through the separation membrane 28 to the transmitting portion 26.

The carbon dioxide, water (gas phase), and gas in the anode off-gas that has passed through the separation membrane 28 are sent as a non-fuel gas from the transmitting portion 26. The non-fuel gas that has been sent is sent by the non-fuel gas pipe P16 via the second heat exchanger 32 to the water tank 42.

In the water tank 42, water liquefied by condensation and non-fuel gas from which the water has been removed and whose main component is carbon dioxide (hereinafter called "carbon dioxide-rich gas") are retained in a separated state. One end of a recovery pipe P18 is connected to a gas retention portion in the upper part of the water tank 42, and one end of a water circulation pipe P19 that supplies water to the vaporizer 12 is connected to a liquid retention portion in the lower part of the water tank 42. The carbon dioxide-rich gas is sent to the recovery pipe P18.

The PSA device 46 is connected to the other end of the recovery pipe 18. In the PSA device 46, components other than carbon dioxide are removed by adsorption from the carbon dioxide-rich gas (hereinafter this gas is called "carbon dioxide gas"), and the carbon dioxide gas is sent to a CO2 pipe P20. One end of the CO2 pipe P20 is connected to the PSA device 46, and the other end of the CO2 pipe P20 is connected to the carbon dioxide recovery tank 48. The carbon dioxide gas sent from the PSA device 46 travels through the CO2 pipe 20 and is retained in the carbon dioxide recovery tank 48. A flowmeter 48A is provided in the inlet of the carbon dioxide recovery tank 48. The flow rate of the gas flowing into the carbon dioxide recovery tank 48 is measured by the flowmeter 48A. It will be noted that the CO2 pipe P20 may also be connected to a pipe for supply to another system. Furthermore, the fill amount and pressure of the carbon dioxide recovery tank 48 may also be measured.

The suction pump 44 is connected to the recovery pipe P18. The suction pump 44 sucks upstream gas and sends it downstream. The non-fuel gas is sucked from the transmitting portion 26, and sent at a predetermined pressure to the PSA device 46, by the suction pump 44. The flow rate of the non-fuel gas moving from the inflow portion 24 through the separation membrane 28 to the transmitting portion 26 is controlled in accordance with the output of the suction pump 44.

A branch pipe P21 is connected to the recovery pipe P18 downstream of the suction pump 44. An opening and closing valve V1 is provided in the branch pipe P21. Furthermore, an opening and closing valve V2 is provided in the recovery pipe P18 downstream of where the branch pipe P21 is connected. The carbon dioxide-rich gas that has been sent to the recovery pipe P18 is sent to the PSA device 46 when the opening and closing valve V1 is closed and the opening and closing valve V2 is open. Furthermore, the carbon dioxide-rich gas is sent to the branch pipe P21 when the opening and closing valve V1 is open and the opening and closing valve V2 is closed. The branch pipe P21 opens to the outside. In a case where the carbon dioxide recovery tank 48 cannot be filled with the carbon dioxide or a case where recovery of the carbon dioxide is desired to be stopped, the carbon dioxide-rich gas can be sent to the branch pipe P21 and discharged to the outside. Normally the carbon dioxide-rich gas is sent to the PSA device 46.

In the second heat exchanger 32, heat exchange takes place between the non-fuel gas and the air, whereby the air is heated and the non-fuel gas is cooled. Steam in the non-fuel gas that has been cooled condenses and flows into the water tank 42, where it is retained. The carbon dioxide-rich gas from which the steam has been separated and whose carbon dioxide concentration has increased is sent from the recovery pipe P18 and is recovered via the PSA device 46 in the carbon dioxide recovery tank P48.

In the anode 18A and the cathode 18B of the second fuel cell stack 18, electricity is generated by the same reactions as in the first fuel cell stack 16. A power meter E2 is connected to a power cable 18D that draws electrical power from the second fuel cell stack 18. The electrical power that is output from the second fuel cell stack 18 is measured by the power meter E2. The amount of electricity generated by the second fuel cell stack 18 is controlled by the control unit 50.

Used gases discharged from the anode 18A and the cathode 18B are sent by a pipe P11 and a cathode off combustion introduction pipe P12 to the combustor 40 and are incinerated in the combustor 40. The carbon dioxide production system 10A of the present embodiment is a multistage carbon dioxide production system in which the anode off-gas, which is fuel that has been used in the first fuel cell stack 16, is regenerated and is reutilized as a fuel gas in the second fuel cell stack 18.

Combustion exhaust gas is sent from the combustor 40. The combustion exhaust gas flows through a combustion exhaust gas pipe 10 and is discharged via the vaporizer 12.

The control unit 50 controls the entire carbon dioxide production system 10A and is configured to include a CPU, a ROM, a RAM, and a memory. Data and procedures necessary for a later-described carbon dioxide flow rate regulation process and processes during normal operation are stored in the memory. As shown in FIG. 2, the control unit 50 is connected to the feedstock supply blower B1, the water supply pump PO1, the suction pump 44, the first fuel cell stack 16 and the second fuel cell stack 18, the power meters E1 and E2, the flowmeter 48A, and the PSA device 46. The outputs of the feedstock supply blower B1, the water supply pump PO1, the oxidant gas blower B2, the suction pump 44, and the PSA device 46 are controlled by the control unit 50.

Next, the operation of the carbon dioxide production system 10A of the present embodiment will be described.

In the carbon dioxide production system 10A, methane, which is fuel from the gas source, and water from the water tank 42 are supplied to the vaporizer 12. In the vaporizer 12, the methane and water that have been supplied become mixed together and are heated as a result of gaining heat from the combustion exhaust gas flowing through the combustion exhaust gas pipe P10, whereby the water is gasified and becomes steam.

The methane and steam are sent from the vaporizer 12 via the pipe P1 to the reformer 14. In the reformer 14, the fuel gas having a temperature of about 600° C. and including hydrogen is produced by a steam reforming reaction. The fuel gas is supplied via the fuel gas pipe P4 to the anode 16A of the first fuel cell stack 16.

Air is supplied via the oxidant gas pipe P5 to the cathode 16B of the first fuel cell stack 16. Because of this, in the first fuel cell stack 16, electricity is generated by the aforementioned reactions. In accompaniment with this electricity generation, anode off-gas is discharged from the anode 16A of the fuel cell stack 16. Furthermore, cathode off-gas is discharged from the cathode 16B. The cathode off-gas is supplied through the cathode off-gas pipe P6 to the cathode 18B of the second fuel cell stack 18.

The anode off-gas discharged from the anode 16A is guided to the anode off-gas pipe P7 and flows via the first heat exchanger 30 into the inflow portion 24 of the separation unit 20. In the first heat exchanger 30, the temperature of the anode off-gas falls a certain extent from about 650° C. to about 200° C. for example. The temperature here is a temperature at which the gas phase state of the water in the anode off-gas is maintained. The carbon dioxide and the water (gas phase) in the anode off-gas are separated by moving through the separation membrane 28 to the transmitting portion 26. The regenerative fuel gas is sent from the inflow portion 24, travels through the first heat exchanger 30, has its temperature raised to about 600° C., and is supplied by the regenerative fuel gas pipe P9 to the anode 18A of the second fuel cell stack 18.

In the second fuel cell stack 18, electricity is generated by the aforementioned reactions. The gases used in the anode 18A and the cathode 18B are sent by the pipes P11 and P12 to the combustor 40 and are incinerated in the combustor 40. The combustion exhaust gas from the combustor 40 is discharged after undergoing heat exchange in the vaporizer 12.

At the same time, the suction pump 44 sucks the non-fuel gas from the transmitting portion 26 at a predetermined output. The output of the suction pump 44 here is set in accordance with, for example, the amount of electricity required to be generated in the carbon dioxide production system 10A. The non-fuel gas passes through the separation membrane 28, flows into the transmitting portion 26, and is sent from the transmitting portion 26. The non-fuel gas that has been sent is cooled in the second heat exchanger 32 by heat exchange with the air traveling through the oxidant gas pipe P5. Because of this, the steam in the non-fuel gas is condensed and separated from the non-fuel gas. The non-fuel gas and the condensed water are sent to the water tank 42. The carbon dioxide-rich gas after the water has been separated from the non-fuel gas is sent from the water tank 42 to the recovery pipe P18, is sent to the PSA device 46, and is recovered via the PSA device 46 in the carbon dioxide recovery tank 48.

The carbon dioxide production system 10A of the present embodiment separates the carbon dioxide and the water (gas phase) by means of the separation membrane 28 and thereafter condenses the water by heat exchange in the second heat exchanger 32, so compared to a case where the water is condensed before separation by the separation membrane, the regenerative fuel gas can be sent from the inflow portion 24 while keeping the temperature of the regenerative fuel gas high. Consequently, the regenerative fuel gas for electricity generation in the second fuel cell stack 18 can be efficiently reutilized.

Furthermore, the steam in the non-fuel gas that has been discharged from the transmitting portion 26 can be easily separated by condensation to recover the non-fuel gas whose carbon dioxide concentration is high.

Furthermore, because electricity can be generated and carbon dioxide can also be produced in accompaniment with the generation of electricity, carbon dioxide can be easily produced in a location where carbon dioxide is required.

Figure 3:
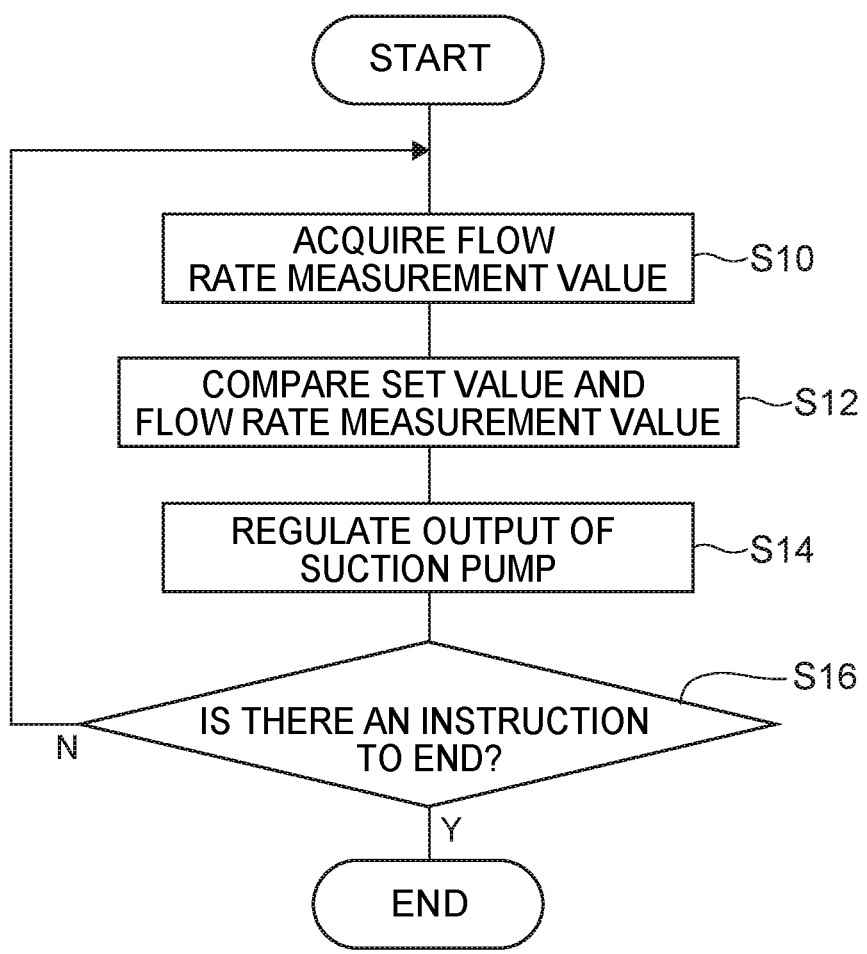
FIG. 3 is a flowchart of a carbon dioxide flow rate regulation process of the first embodiment.

Here, regulation of the flow rate of the carbon dioxide recovered in the carbon dioxide recovery tank 48 will be described. When regulating the flow rate of the carbon dioxide during operation, a desired carbon dioxide flow rate value is input using an input component not shown in the drawings. The value that has been input (set value) is sent to the control unit 50, and the control unit 50 executes a carbon dioxide flow rate regulation process shown in FIG. 3.

In step S10 the control unit 50 acquires the measurement (flow rate measurement value) of the flowmeter 48A, and in step S12 the control unit 50 compares it with the set value. In step S14 the control unit 50 regulates the output of the suction pump 44 on the basis of the result of the comparison between the flow rate measurement value and the set value. In a case where the flow rate measurement value is smaller than the set value, the control unit 50 raises the output of the suction pump 44 to increase the amount of the non-fuel gas passing through the separation membrane 28, and in a case where the flow rate measurement value is greater than the set value, the control unit 50 lowers the output of the suction pump 44 to decrease the amount of the non-fuel gas passing through the separation membrane 28. In this way, by feedback-controlling the suction pump 44 on the basis of the flow rate measurement value, the flow rate of the carbon dioxide gas recovered in the carbon dioxide recovery tank 48 can be regulated to a desired set range. When the carbon dioxide flow rate regulation process is no longer necessary, an instruction to end the process is input using the input component. In step S16 the control unit 50 judges whether or not an instruction to end the process has been input, and, in a case where the judgment is YES, ends the carbon dioxide flow rate regulation process.

It will be noted that although in the present embodiment the control unit 50 brings the flow rate of the carbon dioxide gas recovered in the carbon dioxide recovery tank 48 closer to the set value by regulating the output of the suction pump 44, the control unit 50 may also accomplish this by regulating the outputs of the feedstock supply blower B1 and the water supply pump PO1. Furthermore, the control unit 50 may also accomplish this by regulating the suction pump 44, the feedstock supply blower B1, and the water supply pump PO1 all together, and may also accomplish this by regulating a combination of any plural devices.

Furthermore, the control unit 50 may also measure the pressure in the carbon dioxide recovery tank 48 and/or measure the fill amount to appropriately fill the carbon dioxide recovery tank 48 with the carbon dioxide.

When the control unit 50 regulates the output of the feedstock supply blower B1, in a case where the flow rate measurement value is smaller than the set value, the control unit 50 raises the output of the feedstock supply blower B1 to increase the flow rate of the anode off-gas flowing into the separation unit 20, thereby increasing the amount of the non-fuel gas passing through the separation membrane 28. Furthermore, in a case where the flow rate measurement value is greater than the set value, the control unit 50 lowers the output of the feedstock supply blower B1 to decrease the flow rate of the anode off-gas flowing into the separation unit 20, thereby decreasing the amount of the non-fuel gas passing through the separation membrane 28.

It will be noted that when the control unit 50 regulates the output of the feedstock supply blower B1, the amount of electricity generated is also appropriately regulated.

Furthermore, when the control unit 50 regulates the output of the water supply pump PO1, in a case where the flow rate measurement value is smaller than the set value, the control unit 50 raises the output of the water supply pump PO1 to increase the flow rate of the anode off-gas flowing into the separation unit 20, thereby increasing the amount of the non-fuel gas passing through the separation membrane 28. Furthermore, in a case where the flow rate measurement value is greater than the set value, the control unit 50 lowers the output of the water supply pump PO1 to decrease the flow rate of the anode off-gas flowing into the separation unit 20, thereby decreasing the amount of the non-fuel gas passing through the separation membrane 28.

Furthermore, the control unit 50 may also regulate the amount of electricity generated by the carbon dioxide production system 10A to bring the flow rate of the carbon dioxide gas recovered in the carbon dioxide recovery tank 48 closer to the set value. The control unit 50 may regulate the amount of electricity generated on the basis of the total electrical power generated by the carbon dioxide production system 10A (the sum of the electrical power generated by the first fuel cell stack 16 and the electrical power generated by the second fuel cell stack 18, that is, the sum of the value measured by the power meter E1 and the value measured by the power meter E2) or may regulate the amount of electricity generated on the basis of the electrical power generated by the first fuel cell stack 16 (the value measured by the power meter E1).

When the control unit 50 regulates the amount of electricity generated using the total electrical power generated by the carbon dioxide production system 10A, in a case where the flow rate measurement value is smaller than the set value, the control unit 50 increases the sum of the amount of electricity generated by the first fuel cell stack 16 and the amount of electricity generated by the second fuel cell stack 18 (the sum of the value measured by the power meter E1 and the value measured by the power meter E2). In a case where the flow rate measurement value is greater than the set value, the control unit 50 decreases the sum of the amount of electricity generated by the first fuel cell stack 16 and the amount of electricity generated by the second fuel cell stack 18 (the sum of the value measured by the power meter E1 and the value measured by the power meter E2).

It will be noted that when the control unit 50 regulates the amount of electricity generated using the total electrical power generated by the carbon dioxide production system 10A, the control unit 50 can regulate the electrical power generated by the first fuel cell stack 16 so that a desired flow rate of the carbon dioxide is obtained and also regulate the electrical power generated by the second fuel cell stack 18 so that the total electrical power generated by the carbon dioxide production system 10A becomes a desired value.

Furthermore, when the control unit 50 regulates the amount of electricity generated using the electrical power generated by the first fuel cell stack 16, in a case where the flow rate measurement value is smaller than the set value, the control unit 50 increases the amount of electricity generated by the first fuel cell stack 16 (the value measured by the power meter E1). In a case where the flow rate measurement value is greater than the set value, the control unit 50 decreases the amount of electricity generated by the first fuel cell stack 16 (the value measured by the power meter E1).

It will be noted that when the control unit 50 regulates the amount of electricity generated using the electrical power generated by the first fuel cell stack 16, the control unit 50 may also regulate the electrical power generated by the second fuel cell stack 18 or may leave be, without regulating, the electrical power generated by the second fuel cell stack 18.

Furthermore, in the present embodiment, the carbon dioxide production system 10A includes the PSA device 46, but it is not invariably necessary to install the PSA device 46. By installing the PSA device 46 and regulating the adsorption conditions of the carbon dioxide and other components, the concentration of the carbon dioxide recovered in the carbon dioxide recovery tank 48 can be regulated.

It will be noted that although in the present embodiment the carbon dioxide is recovered between the first fuel cell stack 16 and the second fuel cell stack 18 in one carbon dioxide production system, the carbon dioxide may also be recovered between plural fuel cell systems. That is, anodes of fuel cell stacks may be connected in series between plural fuel cell systems, and the carbon dioxide may be separated and recovered from the anode off-gas before the anode off-gas is discharged from the anode of the fuel cell stack of the upstream fuel cell system and supplied to the anode of the downstream fuel cell system.

Second Embodiment

Next, a second embodiment of the present disclosure will be described. In the present embodiment, parts that are the same of those of the first embodiment are assigned the same reference signs, and detailed description thereof will be omitted.

Figure 4:
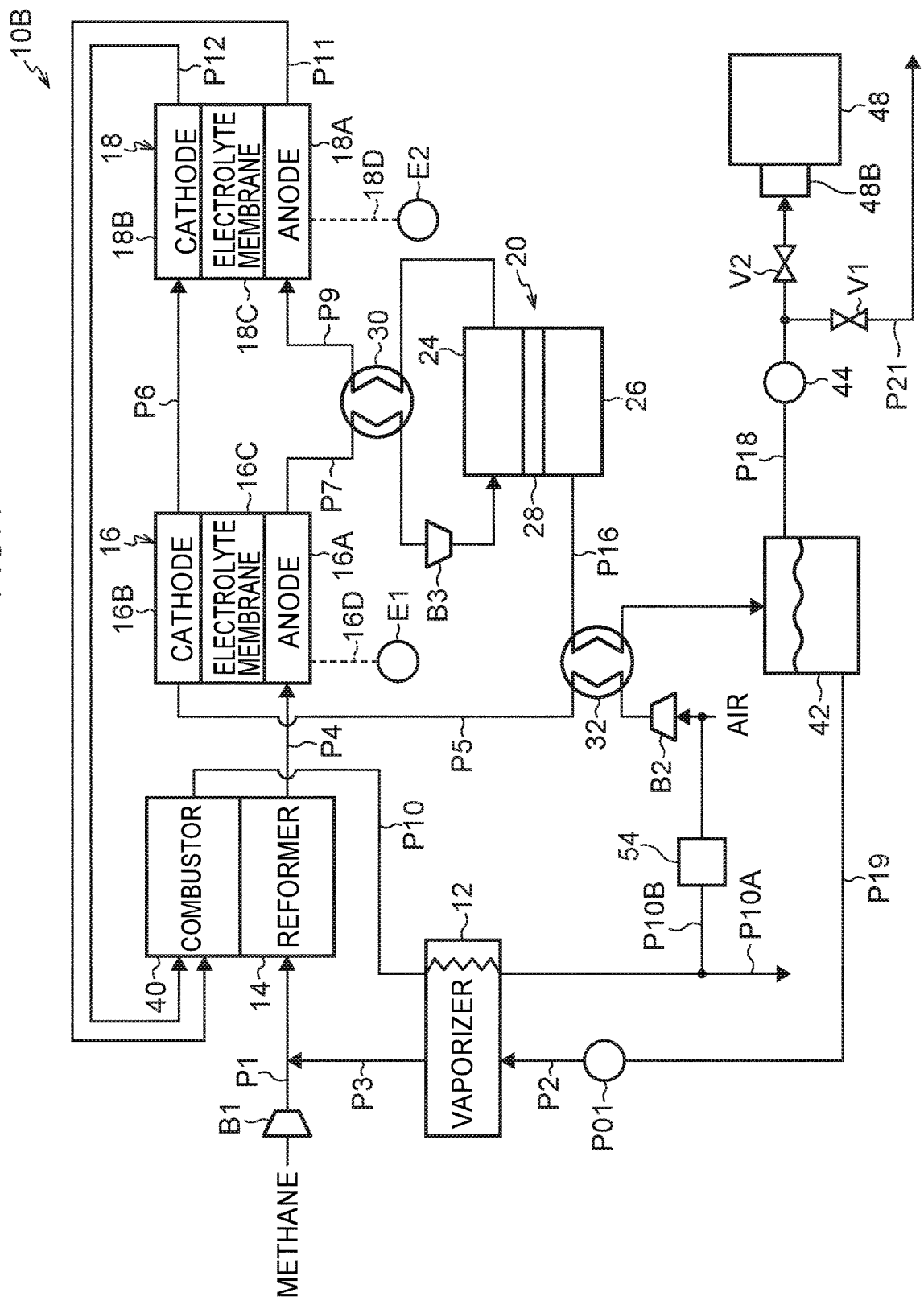
FIG. 4 is a schematic diagram of a carbon dioxide production system pertaining to a second embodiment.
Figure 5:
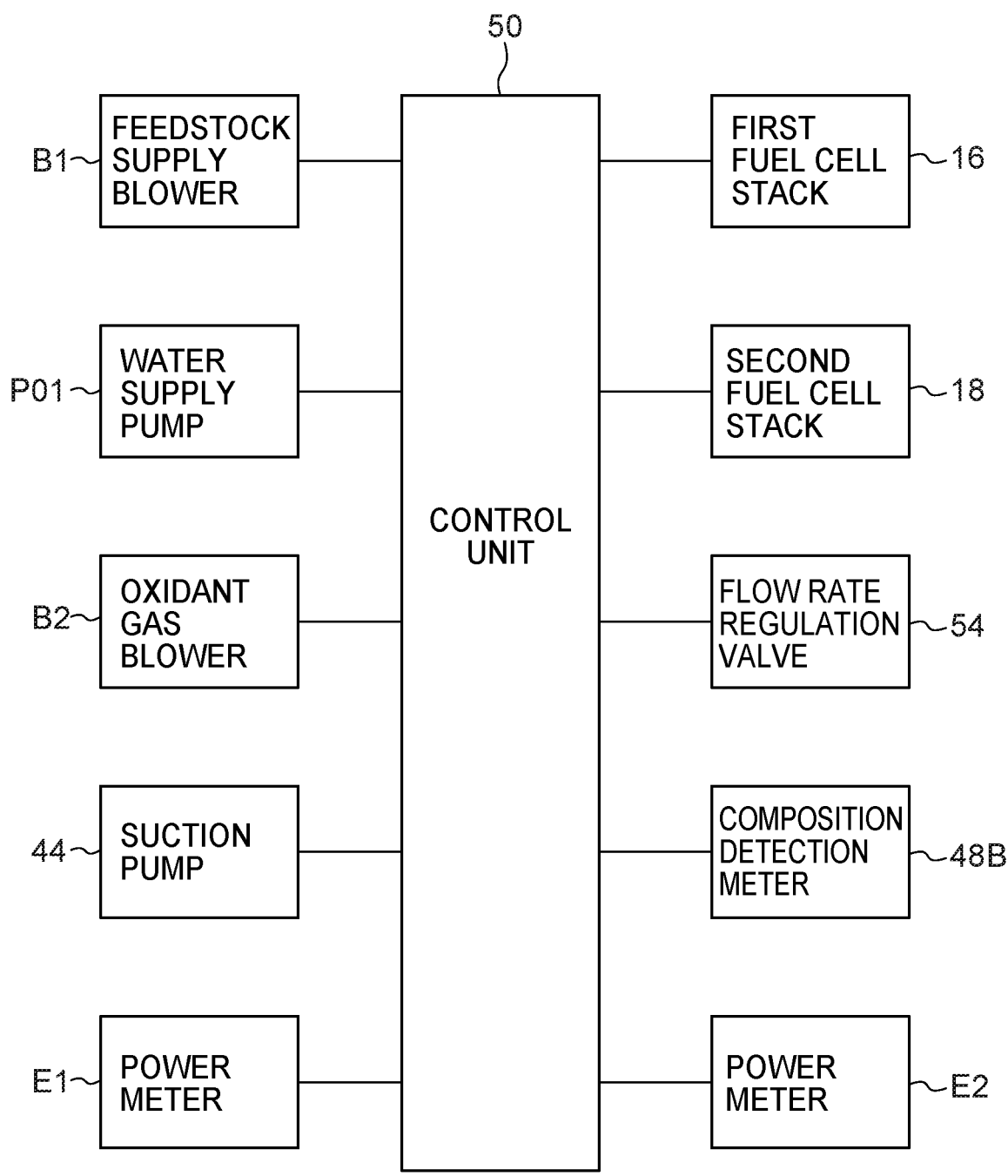
FIG. 5 is a block diagram of a control system of the carbon dioxide production system pertaining to the second embodiment.

As shown in FIG. 4, a carbon dioxide production system 10B of the present embodiment does not have the PSA device 46. Furthermore, the combustion exhaust gas discharged from the vaporizer 12 through the combustion exhaust gas pipe P10 branches into a combustion exhaust gas exhaust pipe P10A and a temperature regulation pipe P10B. The combustion exhaust gas is exhausted to the outside from the combustion exhaust gas exhaust pipe P10A. The temperature regulation pipe 10B is connected to the upstream side of the oxidant gas blower B2. A flow rate regulation valve 54 is provided in the temperature regulation pipe 10B, and the flow rate of the combustion exhaust gas sent to the oxidant gas blower B2 is regulated by the opening degree of the flow rate regulation valve 54. As shown in FIG. 5, the flow rate regulation valve 54 is connected to the control unit 50, and its opening degree is regulated by the control unit 50.

A composition detection meter 48B is provided, instead of the flowmeter 48A, in the inlet of the carbon dioxide recovery tank 48. The composition detection meter 48B is configured to be capable of detecting the carbon dioxide concentration of the gas flowing into the carbon dioxide recovery tank 48. The composition detection meter 48B is connected to the control unit 50 and transmits the carbon dioxide concentration value it has detected to the control unit 50.

Next, the operation of the carbon dioxide production system 10B of the present embodiment will be described.

Figure 6:
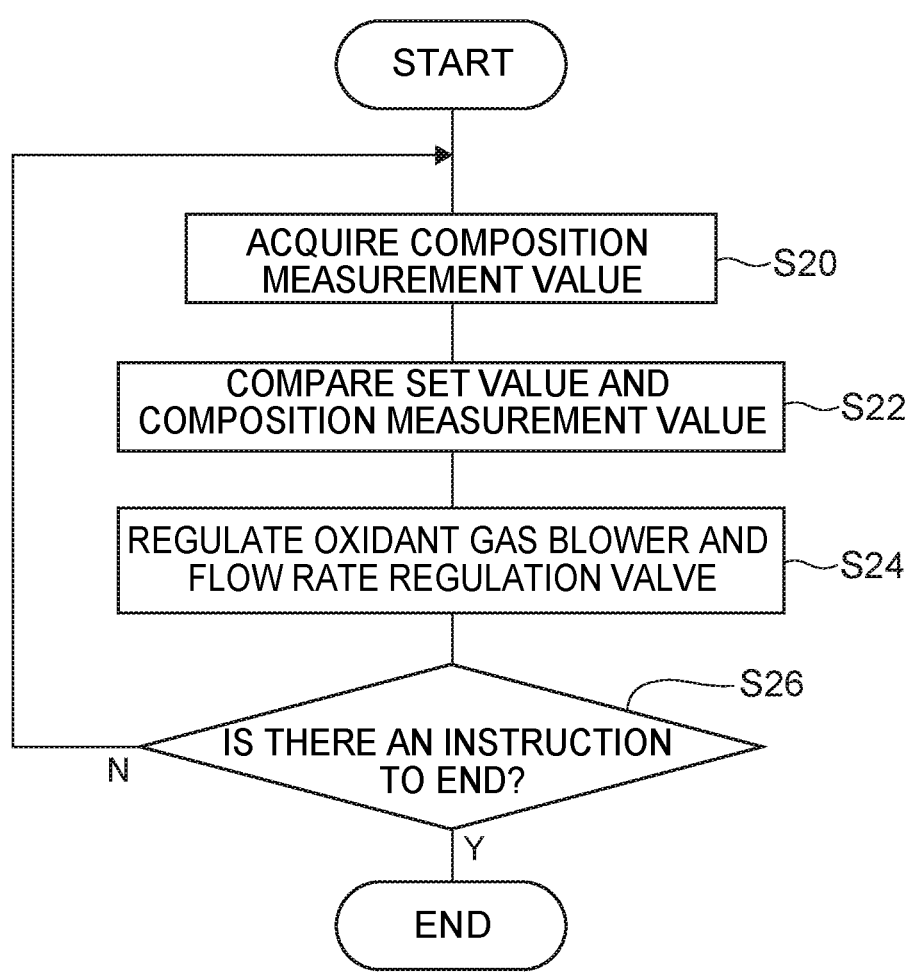
FIG. 6 is a flowchart of a carbon dioxide concentration regulation process of the second embodiment.

In the carbon dioxide production system 10B, electricity is generated in the same way as in the first embodiment. The carbon dioxide production system 10B can regulate the concentration of the carbon dioxide recovered in the carbon dioxide recovery tank 48. When regulating the concentration of the carbon dioxide, a desired carbon dioxide concentration value is input using an input component not shown in the drawings. The value that has been input (set value) is sent to the control unit 50, and the control unit 50 executes a carbon dioxide flow rate regulation process shown in FIG. 6.

In step S20 the control unit 50 acquires the measurement value (composition measurement value) of the composition detection meter 48B, and in step S22 the control unit 50 compares it with the set value. In step S24 the control unit 50 regulates the flow rate regulation valve 54 or the oxidant gas blower B2 on the basis of the result of the comparison between the composition measurement value and the set value.

In a case where the composition measurement value is smaller than the set value, the control unit 50 closes the flow rate regulation valve 54 to raise the output of the oxidant gas blower B2. Because of this, the flow rate of the oxidant gas traveling through the oxidant gas pipe P5 increases, the steam condensed by heat exchange in the second heat exchanger 32 increases, and the concentration of the carbon dioxide gas recovered in the carbon dioxide recovery tank 48 becomes higher. In a case where the composition measurement value is greater than the set value, the control unit 50 opens the flow rate regulation valve 54. Because of this, the temperature of the oxidant gas traveling through the oxidant gas pipe P5 increases, the steam condensed by heat exchange in the second heat exchanger 32 decreases, and the concentration of the carbon dioxide gas recovered in the carbon dioxide recovery tank 48 becomes lower.

In this way, by feedback-controlling the oxidant gas blower B2 and the flow rate regulation valve 54 on the basis of the composition measurement value, the concentration of the carbon dioxide gas recovered in the carbon dioxide recovery tank 48 can be regulated to a desired set range. When the carbon dioxide concentration regulation process is no longer necessary, an instruction to end the process is input using the input component. In step S26 the control unit 50 judges whether or not an instruction to end the process has been input, and, in a case where the judgment is YES, ends the carbon dioxide concentration regulation process.

Third Embodiment

Next, a third embodiment of the invention will be described. It will be noted that parts that are the same of those of the first embodiment are assigned the same reference signs, and detailed description thereof will be omitted.

Figure 7:
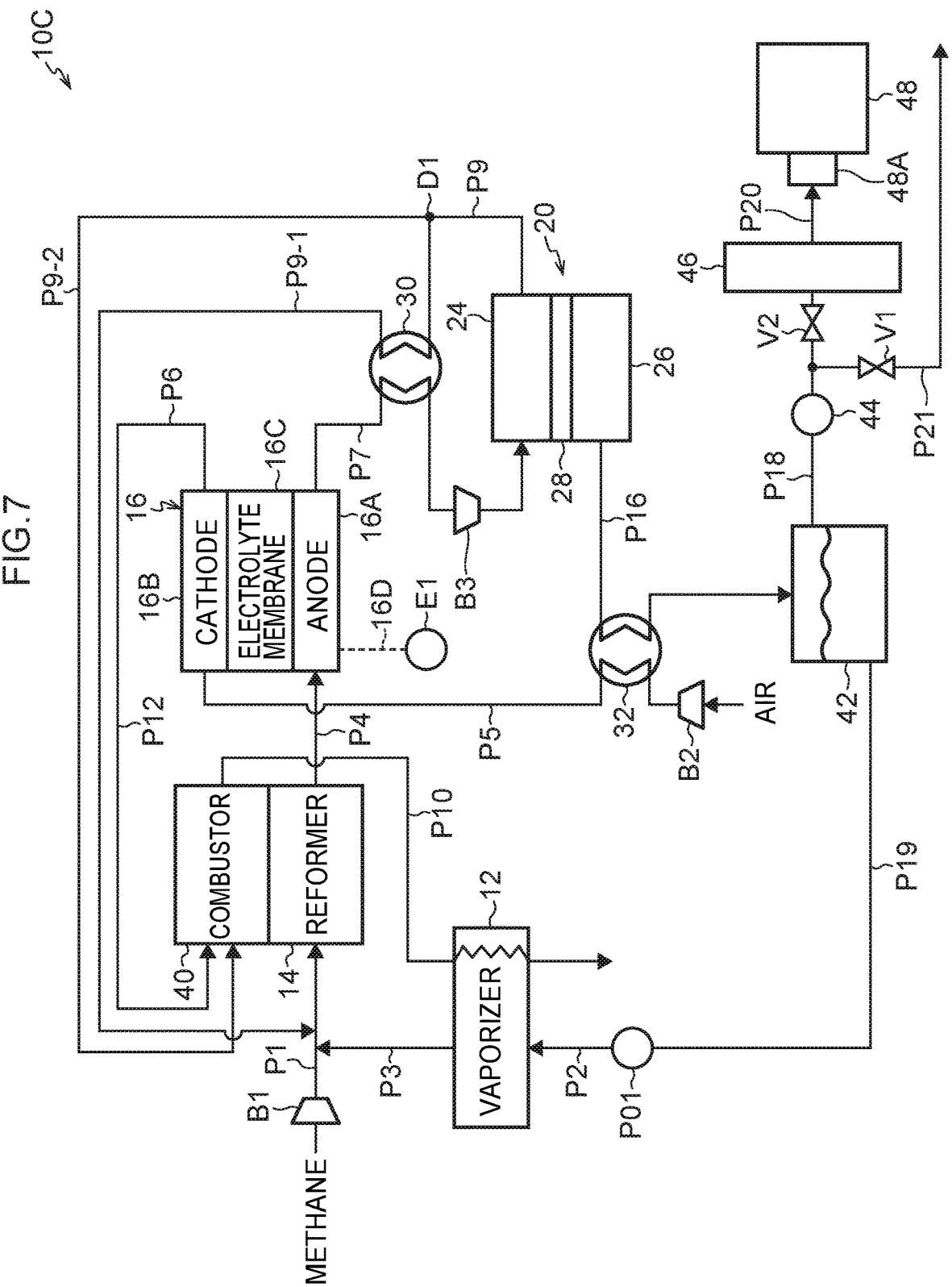
FIG. 7 is a schematic diagram of a carbon dioxide production system pertaining to a third embodiment.

FIG. 7 shows a carbon dioxide production system 10C pertaining to the third embodiment of the invention. The carbon dioxide production system 10C differs from the carbon dioxide production system 10A described in the first embodiment in that it does not have the second fuel cell stack 18.

The regenerative gas pipe P9 connected to the separation unit 20 branches at a junction D1 provided upstream of the first heat exchanger 30. One branch, a circulation gas pipe P9-1, is connected via the first heat exchanger 30 to the pipe P1. Another branch, a regenerative fuel gas pipe P9-2, is connected to the combustor 40. At the junction D1, the regenerative fuel gas is distributed to the circulation gas pipe P9-1 and the regenerative fuel gas pipe P9-2.

The regenerative fuel gas introduced via the circulation gas pipe P9-1 to the reformer 14 becomes mixed with the methane and the steam supplied from the vaporizer 12 and is supplied to the reformer 14. The regenerative fuel gas introduced via the regenerative fuel gas pipe P9-2 to the combustor 40 is combusted in the combustor 40. It will be noted that the cathode off-gas discharged from the cathode 16B is introduced via the cathode off-gas pipe P6 to the combustor 40.

The carbon dioxide production system 10C of the present embodiment is a circulating carbon dioxide production system in which the anode off-gas, which is fuel used in the first fuel cell stack 16, is regenerated and is reutilized again in the first fuel cell stack 16. In the present embodiment also, the same effects as in the first embodiment can be obtained.

Fourth Embodiment

Next, a fourth embodiment of the invention will be described. It will be noted that parts that are the same of those of the first to third embodiments are assigned the same reference signs, and detailed description thereof will be omitted.

Figure 8:
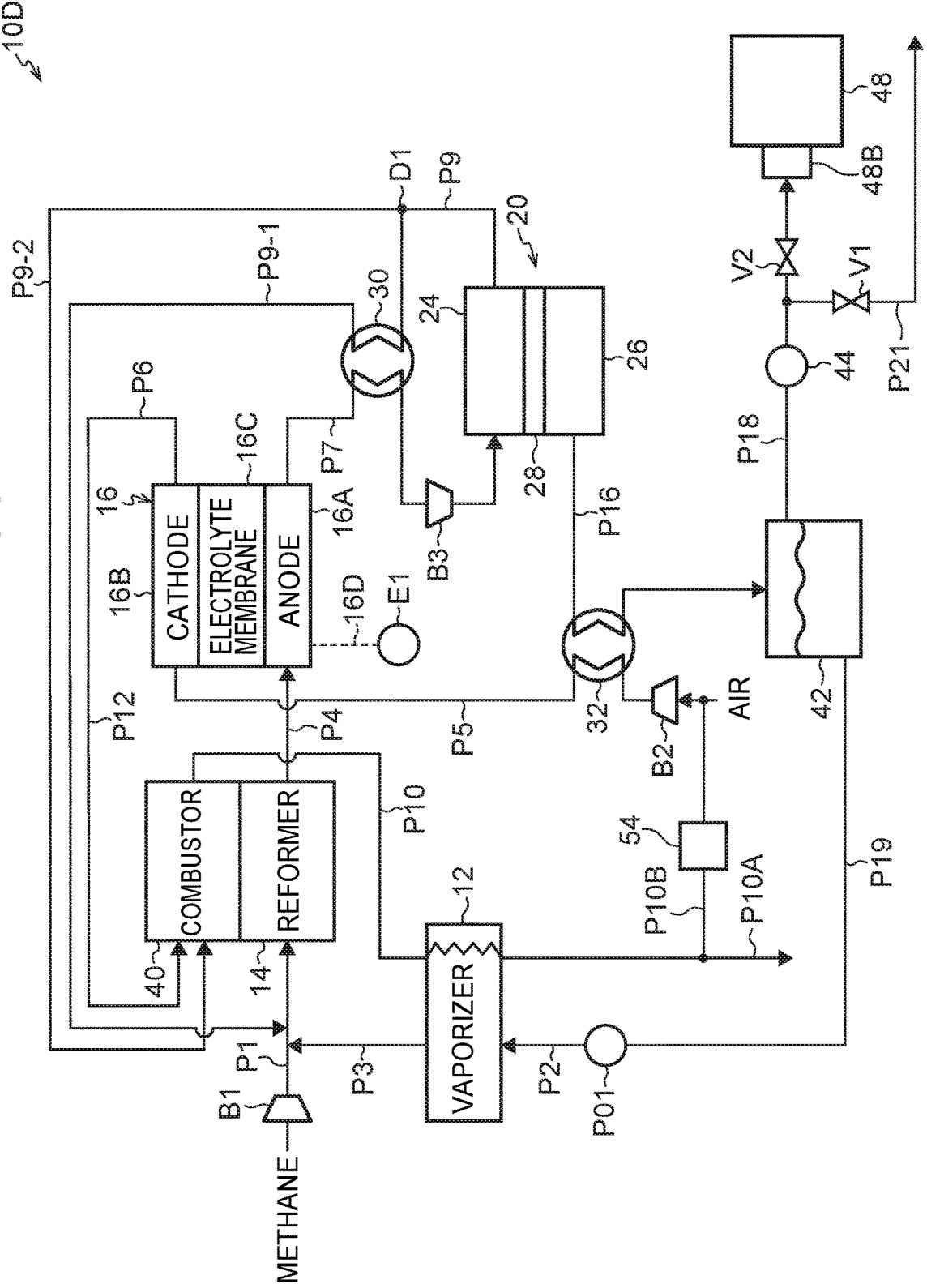
FIG. 8 is a schematic diagram of a carbon dioxide production system pertaining to a fourth embodiment.

FIG. 8 shows a carbon dioxide production system 10D pertaining to a fourth embodiment of the invention. The carbon dioxide production system 10D, like the carbon dioxide production system 10C described in the third embodiment, is a circulating carbon dioxide production system in which the anode off-gas, which is fuel used in the first fuel cell stack 16, is regenerated and is reutilized again by the first fuel cell stack 16.

The carbon dioxide production system 10D, compared to the carbon dioxide production system 10C described in the third embodiment, does not have the PSA device 46 as in the second embodiment. Furthermore, the combustion exhaust gas discharged from the vaporizer 12 through the combustion exhaust gas pipe P10 branches into a combustion exhaust gas exhaust pipe P10A and a temperature regulation pipe P10B. The combustion exhaust gas is exhausted to the outside from the combustion exhaust gas exhaust pipe P10A. The temperature regulation pipe P10B is connected to the upstream side of the oxidant gas blower B2. A flow rate regulation valve 54 is provided in the temperature regulation pipe P10B, and the flow rate of the combustion exhaust gas sent to the oxidant gas blower B2 is regulated by the opening degree of the flow rate regulation valve 54.

In the carbon dioxide production system 10D of the present embodiment also, the same effects as in the second embodiment can be obtained.

It will be noted that the invention is not limited to the first to fourth embodiments described above, and the embodiments described above may be combined and implemented by persons skilled in the art within the technical thought of the invention. Furthermore, in the invention, for example, the installation positions and combinations of the heat exchangers, blowers, and pumps are not limited to the ones in these embodiments.

Furthermore, the carbon dioxide recovery tank 48 may also contain a carbon dioxide absorbent or adsorbent. Furthermore, it may also be a carbon dioxide liquefying device or a carbon dioxide solidifying device.

Furthermore, in the embodiments, a hydrocarbon feedstock such as methane is reformed in the reformer 14 to obtain the fuel gas, but a fuel gas including a carbon compound may also be generated outside and supplied to the fuel cell system. Examples of the carbon compound include hydrocarbons, such as methane, and carbon monoxide. Moreover, the hydrocarbon feedstock such as methane may also be supplied directly to the first fuel cell stack 16, without providing the reformer 14, to generate electricity.

The disclosure of Japanese Application No. 2018-019502 is incorporated in its entirety herein by reference. All documents, patent applications, and technical standards mentioned in this specification are incorporated herein by reference to the same extent as if each individual document, patent application, or technical standard were specifically and individually indicated to be incorporated by reference.

The invention claimed is:

1. A carbon dioxide production system, comprising:
    a fuel cell that generates electricity by means of a fuel gas, including a carbon compound, that is supplied to a fuel electrode and an oxidant gas, including oxygen, that is supplied to an air electrode, with anode off-gas being discharged from the fuel electrode;
    a separation unit that separates the anode off-gas into a non-fuel gas including at least carbon dioxide, and a regenerative fuel gas;
    a carbon dioxide recovery unit that recovers the non-fuel gas after it has been separated by the separation unit; and
    a carbon dioxide regulation unit that regulates, to a set range, at least one of a concentration of the carbon dioxide in the non-fuel gas recovered by the carbon dioxide recovery unit or the flow rate of the non-fuel gas.

2. The carbon dioxide production system according to claim 1, further comprising a second fuel cell that generates electricity using the regenerative fuel gas, which is dispensed from the separation unit.

3. The carbon dioxide production system according to claim 2, wherein the carbon dioxide regulation unit regulates an amount of electricity generated by the fuel cell.

4. The carbon dioxide production system according to claim 1, wherein the carbon dioxide regulation unit regulates an amount of electricity generated in the entire system.

5. The carbon dioxide production system according to claim 1, wherein:
    the separation unit separates the anode off-gas into a non-fuel gas including at least carbon dioxide and water, and a regenerative fuel gas, and
    the carbon dioxide production system further comprises a water separation unit that separates the water from the non-fuel gas.

6. The carbon dioxide production system according to claim 5, wherein the water separation unit removes steam from the non-fuel gas by condensation, and the carbon dioxide regulation unit regulates the condensate in the water separation unit.

7. The carbon dioxide production system according to claim 5, further comprising a pressure swing adsorption unit downstream of the water separation unit, wherein the carbon dioxide regulation unit regulates adsorption conditions in the pressure swing adsorption unit.

8. The carbon dioxide production system according to claim 1, wherein the carbon dioxide regulation unit regulates a fuel gas amount sent to the fuel electrode.

9. The carbon dioxide production system according to claim 1, further comprising a reformer that reforms feedstock gas to produce the fuel gas, wherein the carbon dioxide regulation unit regulates the amount of reforming water supplied to the reformer.

10. The carbon dioxide production system according to claim 1, wherein:
    the separation unit is partitioned into a non-transmitting side and a transmitting side by a separation membrane that allows the non-fuel gas to pass therethrough, and
    the carbon dioxide production system further comprises a suction pump that sucks the non-fuel gas from the transmitting side and sends the non-fuel gas to the carbon dioxide recovery unit.

11. The carbon dioxide production system according to claim 10, wherein the carbon dioxide regulation unit regulates a suction flow rate of the suction pump.

* * * * *